May 21, 1957 D. G. C. LUCK 2,792,989
MEANS FOR LOCATING THE POSITION OF A MOBILE CRAFT
Filed June 30, 1953 2 Sheets-Sheet 1

INVENTOR.
David G. C. Luck
BY
ATTORNEY

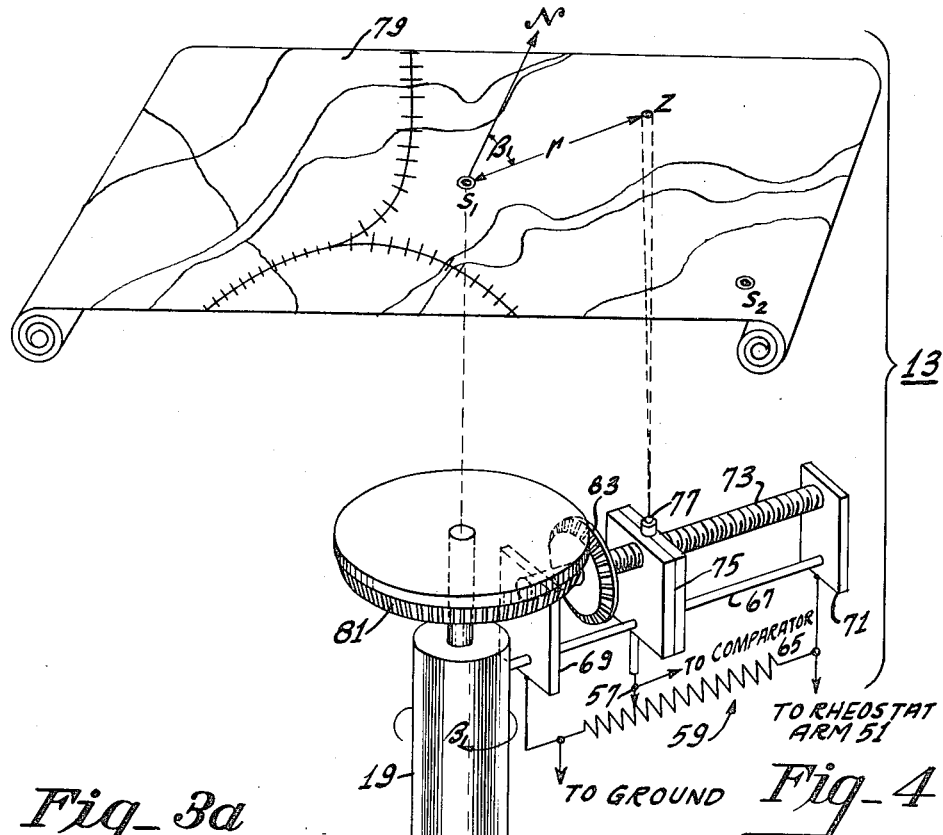

United States Patent Office 2,792,989
Patented May 21, 1957

2,792,989

MEANS FOR LOCATING THE POSITION OF A MOBILE CRAFT

David G. C. Luck, Princeton, N. J., assignor to Radio Corporation of America, a corporation of Delaware Application June 30, 1953, Serial No. 365,217

6 Claims. (Cl. 235—61)

This invention relates to radio navigation systems useful in air navigation and is related to my copending application filed concurrently herewith, Serial No. 365,007, filed June 30, 1953, now Patent No. 2,717,735. The present invention relates particularly to improved methods of and means for utilizing directional signals radiated by a pair of spaced omnidirectional radio range stations for automatically determining the position of a mobile craft receiving the directional signals transmitted by both stations. The positional data herein provided is given in polar coordinate form and is referenced with respect to the position of one of the omni stations.

Heretofore when a pilot or navigator desired to obtain a "fix" on the position of his craft frequently it has been necessary either to use trigonometric methods, making computations thereby, or to construct intersecting azimuths graphically. Such arrangements are not desirable, particularly in small craft, since these functions usually are performed by the pilot and may distract his attention from other required activities. More recently it has been proposed to automatically locate a craft's position by combining omni bearing data with range data derived from radar distance measuring equipment (DME). However, the latter method requires that the mobile craft carry not only omni and radar receiving equipment but also that it carry a radar transmitter.

While the omni-DME position determining method affords the desired information, the method has some disadvantages. The additional equipment required (i. e., the radar transmitter and receiver) is rather complex and is expensive, heavy, and bulky. The weight and cost factors are not advantageous insofar as the adoption of the method by owners of small or light aircraft is concerned and may be restrictive even for commercial airline navigation purposes.

An object of the instant invention is to provide improved methods and means for automatically enabling a mobile craft to ascertain its position.

Another object of the invention is to provide methods and means for utilizing directional signals radiated by a pair of spaced omni stations for determining the position of a mobile craft receiving the directional signals.

Another object of the invention is to provide improved apparatus to be carried by a mobile craft for enabling the craft to determine its positional location.

Another object of the invention is to provide apparatus of the above type which is especially suitable for use by light aircraft.

A further object is to simplify the equipment carried by a mobile craft and used for determining its position.

A further object of the invention is to reduce the size and weight of equipment used by a mobile craft for "fixing" its position.

A still further object of the invention is to provide omnirange radio navigation system apparatus for providing data in polar coordinate form for automatically enabling a mobile craft to determine its position with respect to a given omnirange transmitting station.

A still further object of the invention is to provide improved and simplified computing apparatus for utilizing directional signals radiated by spaced omnirange stations for enabling a mobile craft carrying the apparatus to determine its position.

According to the present invention improved methods and means are hereinafter disclosed and claimed for automatically locating the position of a mobile craft. The instant apparatus includes an omnirange navigation system receiver and relatively simple computer means associated therewith but does not require the radar transmitter-receiver apparatus heretofore mentioned. The heavy and costly radar apparatus has been replaced with a simple and inexpensive computer mechanism which provides substantially the same information afforded by the omni-DME combination. Moreover, the present system is suitable and adapted for use by light as well as heavy aircraft.

According to the invention, directional signals radiated by a pair of spaced omni stations are received at a given mobile craft and are translated into different mechanical shaft rotations, the angular displacement of each shaft being proportional to the bearing of the craft with respect to each omni station. The shaft motion data and other predetermined data are applied to a novel computer. In the computer the data are combined to provide the distance from the craft to one of the omni stations and its bearing with respect to a reference direction. The polar coordinate data (i. e., distance and bearing) is applied to an indicator mechanism which provides an indication of the instantaneous position of the craft in relation to the terrain over which it is flying.

The invention will be described in detail with reference to the accompanying drawing in which:

Figures 3a and 3b illustrate rheostat-potentiometer combinations employed in the computing apparatus of Figure 2 and values therefor; and Figure 4 is a perspective view of an indicating mechanism and associated map employed in connection with the apparatus of Figure 2.

Similar reference characters are applied to similar elements throughout the drawings.

*Derivation of equation to be solved*

Figure 1:
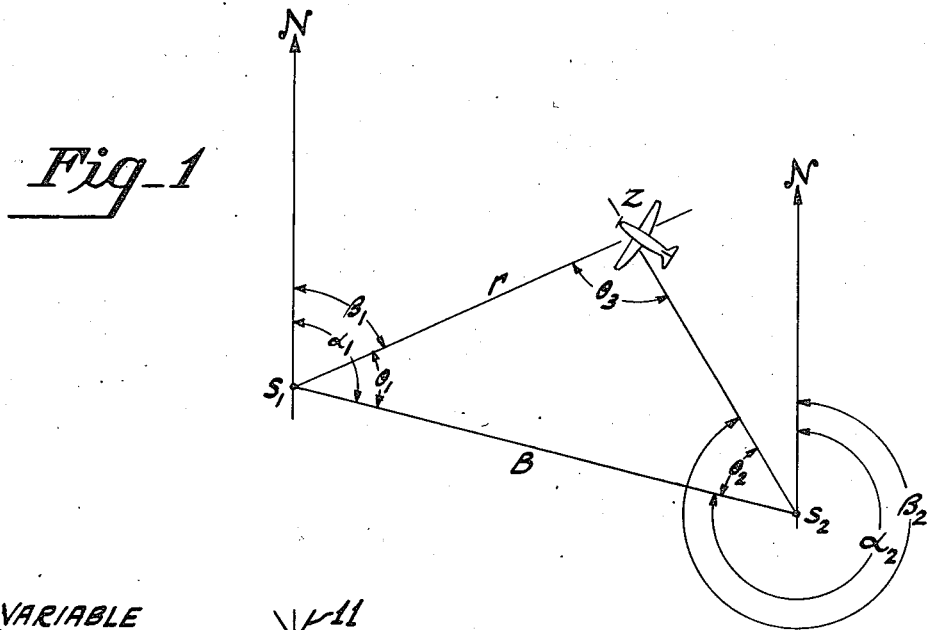
Figure 1 is a diagram illustrating the position of a mobile craft with respect to a pair of spaced omnirange radio range stations.

Referring to Figure 1 of the drawing, a westerly omnirange station $S_1$ and an easterly omnirange station $S_2$ are located at the positions indicated. The base line extending between the stations $S_1$ and $S_2$ is of length B and is oriented at $\alpha_1$ degrees from station $S_1$ and $\alpha_2$ degrees from station $S_2$, both with respect to a reference direction, true north in the present example. An aircraft is shown at point Z located a distance $r$ from station $S_1$, bearing $\beta_1$ degrees from station $S_1$, and bearing $\beta_2$ degrees from station $S_2$.

In the triangle defined by $S_1ZS_2$ and having interior angles $\theta_1$, $\theta_2$, and $\theta_3$, by the law of sines $$\frac{r}{\sin \theta_2} = \frac{B}{\sin \theta_3} \tag{1}$$

Since $\theta_1 = \alpha_1 - \beta_1$, $\theta_2 = \beta_2 - \alpha_2$, and $\theta_1 + \theta_2 + \theta_3 = 180°$, then $\theta_3 = 180° - (\theta_1 + \theta_2) = \beta_1 - \beta_2 + \alpha_2 - \alpha_1 + 180°$. Because stations $S_1$ and $S_2$ are spaced apart distance B and there is convergence of meridians and a difference of magnetic declinations for the two stations, $\alpha_2 = \alpha_1 + 180° + \delta$, $\delta$ being the angular difference between the north reference direction at station $S_1$ and the north reference direction at station $S_2$.

For the sake of simplicity the small correction $\delta$ will be neglected in this part of the discussion. Thus $$\sin \theta_3 = \sin(\beta_1 - \beta_2 + 360°) = \sin(\beta_1 - \beta_2)$$

and Equation 1 becomes $$\frac{r}{\sin(\beta_2 - \alpha_2)} = \frac{B}{\sin(\beta_1 - \beta_2)} \quad (2)$$

In order to make practical the apparatus required for obtaining a solution for $r$ it is desirable to rewrite Equation 2 so that quantities which do not vary over a wide range are placed in the denominator. Ordinarily D does not vary over a range greater than ten to one. Also, for reasonable position fixing accuracy the intersection defined by $\beta_1 - \beta_2$ should remain reasonably near $\pm 90°$ (i. e., within the ranges $-30°$ to $-150°$ and $+30°$ to $+150°$, but not within the ranges $-30°$ to $+30°$ and $-150°$ through $180°$ to $+150°$).

Equation 2 thus may be rewritten as $$\frac{r}{B} = \frac{\sin(\beta_2 - \alpha_2)}{\sin(\beta_1 - \beta_2)} \quad (3)$$

The aircraft shown at Z may operate in regions either southerly or northerly with respect to base line B, and a study of Figure 1 indicates that both $\sin(\beta_2 - \alpha_2)$ and $\sin(\beta_1 - \beta_2)$ change algebraic sign when the aircraft crosses the base line or its extensions. Thus $r$ as computed from Equation 3 remains positive for all positions of the craft. Under these conditions one need consider only absolute values of the two sine functions without regard to algebraic sign and $$\frac{r}{B} = \frac{|\sin(\beta_2 - \alpha_2)|}{|\sin(\beta_1 - \beta_2)|} \quad (4)$$

Figure 2:
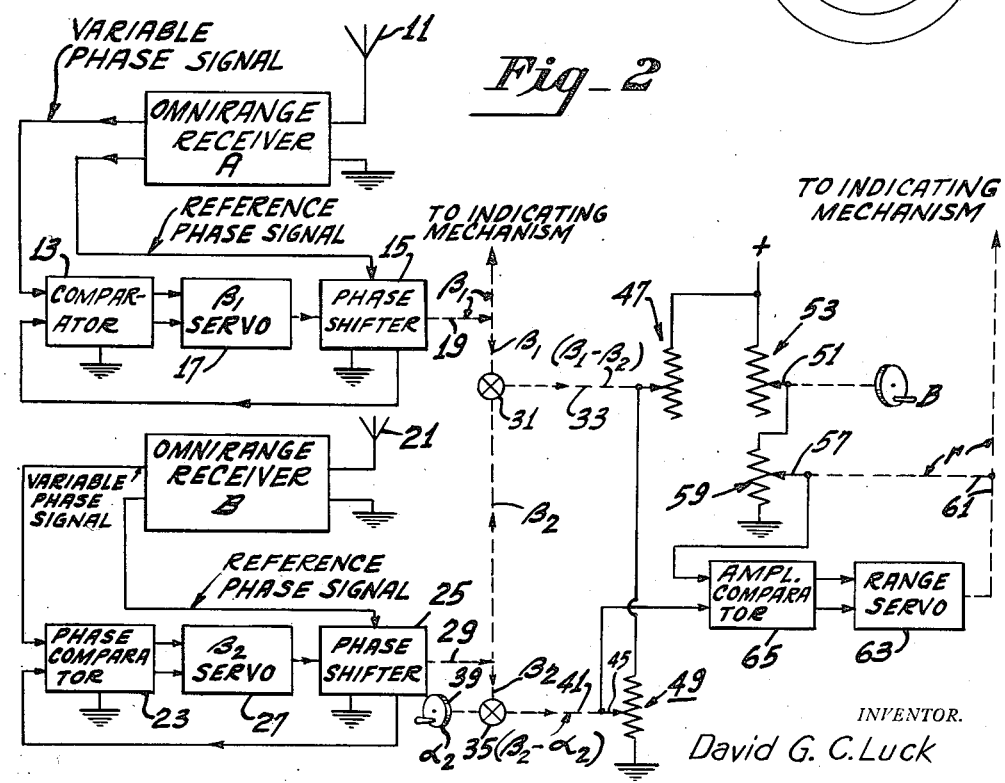
Figure 2 is a schematic circuit diagram, partially in block form, of omnirange radio receiving and computing apparatus, according to the invention, for enabling the mobile craft of Figure 1 to automatically determine its position.

In Equation 4 it is seen that $\alpha_2$ and B are constant known quantities and that $\beta_1$, $\beta_2$, and $r$ are variables which vary in accordance with and depend upon the instantaneous in-flight position of the aircraft presently shown at point Z. In Figure 2 typical apparatus is shown, according to the invention, for use aboard the mobile aircraft. The apparatus mechanizes Equation 4 to provide the instantaneous values of $r$, for enabling the craft to automatically locate its position.

*Proportional shaft rotation*

Referring to Figure 2, directional signals radiated by station $S_1$ are intercepted by an antenna 11 which is coupled to the input circuits of an omnirange receiver A tuned to receive the signals. The radiated signals comprise (1) a directional signal rotating at thirty revolutions per second, perceived as amplitude modulation of a received VHF carrier with modulation phase dependent on receiver azimuth, and (2) a thirty cycle per second reference phase signal frequency-modulating a 9.96 kilocycle subcarrier which in turn amplitude-modulates an omnidirectionally radiated VHF carrier. In receiver A the modulated carrier waves are amplified, demodulated, and a pair of thirty cycle per second signals (a reference phase signal and a variable phase signal) are separately provided at its output terminals. The phase relation (phase difference) of the signals is proportional to the bearing $\beta_1$ of the craft at point Z from station $S_1$ with respect to true north.

One of the directional signals, for example, the variable phase signal is applied to one input of a phase comparator circuit 13 while the other signal, the reference phase signal, is applied to a phase shifter unit 15 which includes a phase splitter and a synchro resolver. The phase shifter output is applied to a second circuit input of the phase comparator 13. The output of the phase comparator 13 controls the rotation of a servomotor 17 which in turn drives the phase shifter 15. The operation of the feedback system is such that servomotor 17 drives the phase shifter 15 to introduce a phase shift which nullifies the phase difference existing between the 30 cycle per second signals appearing at the output of the omni receiver A. The servomotor shaft 19 thus takes an angular position which is directly proportional to the angular position of the aircraft at point Z from station $S_1$ with respect to north.

In substantially the same manner described above directional signals radiated by station $S_2$ are intercepted by antenna 21 and applied to omni receiver B which is tuned to a frequency band different from that to which receiver A is tuned. In receiver B the directional signals are amplified, demodulated, and are separated to reproduce the 30 cycle per second modulation signals. In this instance the phase relation of the reference and variable phase signals is proportional to the bearing ($\beta_2$) of the craft at point Z from station $S_2$ with respect to true north. A phase comparator 23, a servomotor 27, and a phase shifter 25 are connected in a feedback loop with receiver B in the manner described above with reference to receiver A and its associated circuitry so that the shaft 29 of servomotor 25 assumes an angular position proportional to the angular position of the craft at Z from station $S_2$ with respect to north.

The $\beta_1$ shaft rotation is transmitted to an indicating mechanism which will be described later with reference to Figure 4 and also to a computing mechanism. The $\beta_2$ shaft rotation is transmitted only to the computing mechanism.

*Polar coordinate computing mechanism*

The computing mechanism for solving for the distance $r$ in Equation 4 includes a first mechanical differential 31. The angular displacements of shafts 19 and 29 (i. e., the $\beta_1$ and $\beta_2$ displacements) are combined in the differential 31 so that an angular displacement $\beta_1 - \beta_2$ is imparted to a different shaft 33. A second mechanical differential 35 is provided in which the angular displacements of shaft 29 ($\beta_2$) and a still further shaft 37 ($\alpha_2$) are combined. The $\alpha_2$ displacement is manually set into the computer by some convenient means such as a handcrank 39 and is proportional to the bearing of base line B with respect to the north reference of station $S_2$. The $\alpha_2$ and $\beta_2$ quantities are combined to impart an angular displacement to a shaft 41 which is $\beta_2 - \alpha_2$. Shafts 33 and 41 control the positions of the movable arms 43 and 45, respectively, of a sine wound rheostat 47 and a sine wound potentiometer 49.

The computer also includes a second serially-connected rheostat-potentiometer combination 53, 59. In this instance the position of the movable arm 51 of rheostat 53 initially is manually set to a known value by handcrank 55, the value being determined by the actual length of the base line B. The position of the movable arm 57 of potentiometer 59 is mechanically coupled to the shaft 61 of a range servomotor 63. Both rheostat 53 and potentiometer 59 are linearly wound.

The movable arms of potentiometers 49 and 59 are electrically connected to the input circuit of an amplitude comparator 65, the output of which is applied to and drives the range servomotor 63. The range servomotor shaft motion mechanically controls the position of the movable arm 57 of the second potentiometer 59. The shaft motion also is transmitted to the indicating mechanism which will be described with reference to Figure 4. The two rheostat-potentiometer combinations, the amplitude comparator 65, and the range servomotor 63 thus essentially comprise a self-balancing bridge arrangement which, with appropriate resistance scales (chosen as set out below with reference to Figures 3a and 3b) for the rheostats and potentiometers mechanizes Equation 4. Under such conditions the angular rotation of the range servomotor shaft 61 and the position of arm 57 of the second potentiometer are directly proportional to the range of the craft at Z from station $S_1$.

In the event that undesirable error is introduced into the computer because of the angular difference in north references for $\beta_1$ and $\beta_2$, the $\delta$ correction heretofore mentioned may be introduced by applying the correction to the rotation of shaft 29, for example by manually rotating slightly the stator of phase shifter 25.

Determination of computer scales

Referring to Figure 3a, considering the rheostat-potentiometer combination 47—49, the total series resistance of the combination is chosen to equal $k_1|\sin(\beta_1-\beta_2)|$, where $k_1$ is a constant. The total resistance (R1) of rheostat 47 is $k_1\{|\sin(\beta_1-\beta_2)|\max-|\sin(\beta_1-\beta_2)|\min\}$ and the resistance (R) from the top of the rheostat to the movable arm 43 is $k_1\{|\sin(\beta_1-\beta_2)|-|\sin(\beta_1-\beta_2)|\min\}$, where $|\sin(\beta_1-\beta_2)|$ is greater than ½ and less than 1. The total resistance (R0) of potentiometer 49 is selected to equal $k_1|\sin(\beta_1-\beta_2)|\min$ and also to equal $k_2|\sin(\beta_2-\alpha_2)|\max$, where $k_2$ is a constant and $|\sin(\beta_2-\alpha_2)|$ is greater than zero and less than 1. The resistance value (R') between the potentiometer arm 45 and ground is $k_2|\sin(\beta_2-\alpha_2)|$.

With voltage $e_0$ applied to the combination 47—49 and a voltage $e$ picked off by the first potentiometer arm 45, $$\frac{e}{e_0}=\frac{R'}{R+R_0}=\frac{k_2|\sin(\beta_2-\alpha_2)|}{k_1|\sin(\beta_1-\beta_2)|} \quad (5)$$

In Figure 3b the total resistance of the rheostat-potentiometer combination 53—59 is $k_3B$, where $k_3$ is a constant. The total resistance (R1) of rheostat 53 is $$k_3(B_{\max}-B_{\min})$$

and the resistance (R) from the top of the rheostat to the movable arm 51 is $k_3(B-B_{\min})$, where B is greater than $B_{\min}$ and less than $B_{\max}$. The total resistance (R0) of potentiometer 59 is selected to equal $k_3B_{\min}$ and $k_4r_{\max}$, where $k_4$ is a constant and $r$ is greater than zero and less than $r_{\max}$. The resistance value (R') between the potentiometer arm 57 and ground is $k_4r$.

With voltage $e_0$ applied to the combination 53—59 and a voltage $e'$ picked off by the second potentiometer arm 57, $$\frac{e'}{e_0}=\frac{R'}{R+R_0}=\frac{k_4r}{k_3B} \quad (6)$$

The automatic bridge-balancing operation of the range servo 63 serves to maintain $e'=e$. By proportioning the above scale factors in the design of the equipment so that $$\frac{K_2}{K_1}=\frac{K_4}{K_3}$$

equality of $e'$ and $e$ establishes the relation $$\frac{r}{B}=\frac{|\sin(\beta_2-\alpha_2)|}{|\sin(\beta_1-\beta_2)|}$$

The above equation is Equation 4 derived hereinbefore and the position of the range servo shaft 61 then directly represents distance $r$.

Indicating mechanism

Figure 4 shows an indicating mechanism 13 for displaying the $r$, $\beta_1$ information derived above. Shaft 19 (also shown schematically in Figure 2) is the outer of two coaxial shafts 19 and 61. Connected to shaft 19 and extending perpendicularly outward therefrom is a shaft or rod 67. Mounted on shaft 67 are support members 69 and 71 comprising insulators which are adapted to support a lead-screw 73. A movable element 75, in the present example a threaded nut-like traveller, is carried by and is movable along lead-screw 73 and shaft 67. Mounted on top the movable element 75 is a pin-point light source 77 such as a small incandescent lamp.

Physically positioned over the above apparatus is a semi-transparent map 79 on which is displayed data relating to the terrain over which the aircraft is flying. The point on the map corresponding to the position of omni station S1 is displayed in the center of the map and the map is so positioned that S1 is fixed along an extension of the longitudinal axis of shaft 19.

In operation the $\beta_1$ angular displacement of shaft 19 results in shaft 67 being swung through a corresponding angle so that the entire assembly is oriented at $\beta_1$ degrees from north. The pinpoint of light from lamp 77 then falls along a line on map 79 which is $\beta_1$ degrees from north. Rotation of shaft 61, independently rotatable within shaft 19, is transmitted through gears 81 and 83 and results in rotation of lead-screw 73. As the lead-screw 73 turns element 75 moves along the lead-screw and takes a position thereon which is radially proportional to the range $r$ of the craft from station S1. Thus the pin-point of light projected on the semi-transparent map 79 is located at point Z, the in-flight position of the aircraft. As the craft moves along its planned flight course and the received omni signals ($\beta_1$ and $\beta_2$) vary, the computing apparatus supplies appropriate rotational motion to the shaft 19 and lead-screw 73 of the indicating mechanism so that the positional location of the craft continuously is afforded.

Several omnirange stations often exist in the general neighborhood of any one such station selected as S1 and displayed at the center of a map section. Any one of these surrounding stations may be chosen as the cooperating station S2, and will then provide useful position fixes throughout certain sectors of the space around S1. Overprinting of appropriate data on the map 79 makes it very easy for the pilot to choose the appropriate station S2 for the sector in which he wishes to fly. It also may give him directly the frequency to which he must tune the receiver B, the base line length B to which he must set rheostat 53, the angle $\alpha_2$ to which he must set shaft 37, and the convergence correction $\delta$ to be applied to phase shifter 25.

As a further feature of the invention automatic warning may be given if $|\theta_3|$ is less than, say, 30°, or more than 150°. Angle $\theta_3$ is available as a position of shaft 33 ($\beta_1-\beta_2$) and a suitable warning device may be connected thereto to give warning when the angle of intersection of $\beta_1$ and $\beta_2$ may cause too great an error.

The above described computer thus provides automatic means for obtaining a fix of the position of a mobile craft. The fix is given in polar coordinates referenced with respect to the known position of an omnidirectional radio range. The variable quantities fed into the computing apparatus are the $\beta_1$ and $\beta_2$ bearing data from range stations S1 and S2. All other data set into the computer is known in advance and may be pre-set.

As well known in the art $\beta_1$ and $\beta_2$ alternatively may be obtained from bearings taken on non-directional stations at S1 and S2 by automatic direction finders on the mobile craft with north reference given by the magnetic compass on the craft.

While the foregoing description has been directed to the use of separate omni receivers for receiving the directional signals radiated by the two omni stations, the invention is not so limited. A single omni receiver may be used with equal facility by providing for switch-tuning the receiver to receive alternately the signals from both stations.

What is claimed is:

1. For use in a system in which directional navigation signals are radiated by a plurality of spaced transmitting stations, and including receiving apparatus for use on board a mobile craft for receiving and translating directional signals radiated by two of said transmitting stations into first and second quantities representative of the azimuth bearings of said craft with respect to said two stations; apparatus comprising a computer including, means for accepting said first and second quantities as computer inputs, means for producing a third input proportional to the azimuth bearing of an imaginary line extending from one of said two stations to the other of said two stations, means for subtracting said third input from said second input, means for subtracting said second input from said first input, means for producing a fourth input proportional to the length of said imaginary line, an impedance bridge, means for separately controlling impedances of three arms of said bridge in accordance with said fourth input and functions of said subtracted inputs, and means for controlling the impedance of a further arm of said bridge to produce a single computer output which is proportional to the polar coordinate distance of said mobile craft from one of said two stations.

2. For use in a system in which directional navigation signals are radiated by a plurality of spaced transmitting stations, and including receiving apparatus for use on board a mobile craft for receiving and translating directional signals radiated by two of said transmitting stations into first and second mechanical motions representative of the azimuth bearings of said craft with respect to said two stations; apparatus comprising a computer including, means for accepting said first and second mechanical motions as computer inputs, means for producing a third mechanical input proportional to the azimuth bearing of an imaginary line extending from one of said two stations to the other of said two stations, means for subtracting said third mechanical input from said second mechanical input, means for subtracting said second mechanical input from said first mechanical input, means for producing a fourth mechanical input proportional to the length of said imaginary line, an impedance bridge including two parallel branches each having a rheostat connected in series with a potentiometer, means for controlling the position of the movable arm of one of said rheostats in accordance with the difference of said first and second mechanical inputs, means for controlling the position of the movable arm of the potentiometer in series with said one rheostat in accordance with the difference of said second and third mechanical inputs, means for controlling the position of the movable arm of the remaining rheostat in accordance with said fourth mechanical input and means coupled to said bridge for balancing said bridge, whereby the position of the movable arm of said remaining potentiometer is made proportional to the distance of said mobile craft from one of said two stations.

3. Apparatus as claimed in claim 2 wherein said one rheostat and the potentiometer serially connected therewith are wound in accordance with a sine function and the remaining rheostat and potentiometer are substantially linearly wound.

4. Apparatus as claimed in claim 3 wherein the movable arms of said potentiometers are electrically connected to an amplitude comparison means, the output of said comparison means controlling motor means which in turn mechanically adjusts the position of said remaining potentiometer arm.

5. For use in a system in which directional navigation signals are radiated by a plurality of spaced transmitting stations, apparatus for use on a mobile craft for enabling the craft to determine its position comprising, means for receiving directional signals radiated by two of said transmitting stations, means coupled to said receiving means for translating said received directional signals into different quantities representative of the azimuth bearings of said craft with respect to said two stations, means for producing an additional quantity proportional to the azimuth bearing of an imaginary line extending from one of said two stations to the other of said two stations, means for producing a further quantity proportional to the length of said imaginary line, means for combining functions of said quantities to produce a single output which is proportional to the polar coordinate distance of said mobile craft from one of said two stations, and display means responsive to one of said azimuth quantities and said single computer output for displaying said distance output and one of said azimuth bearing quantities to indicate the position of said craft.

6. For use in a system in which directional navigation signals are radiated by a plurality of spaced transmitting stations, and including receiving apparatus for use on board a mobile craft for receiving and translating directional signals radiated by two of said transmitting stations into different quantities representative of the azimuth bearings of said craft with respect to said two stations; apparatus comprising, a computer including means for accepting said different quantities as computer inputs, means for producing an additional computer input proportional to the azimuth bearing of an imaginary line extending from one of said two stations to the other of said two stations, means for producing a further computer input proportional to the length of said imaginary line, means for combining functions of said inputs to produce a single output which is proportional to the polar coordinate distance of said mobile craft from one of said two stations, and display means responsive to one of said azimuth quantities and said single computer output for displaying said distance output and one of said azimuth bearing quantities to indicate the position of said craft.

References Cited in the file of this patent

UNITED STATES PATENTS 2,510,384 Dehmel June 6, 1950

OTHER REFERENCES

Proc. National Elec. Conference, 1947, vol. III, page 212.

"Punched-Card Controlled Aircraft Navigation Computer," by E. H. Fritze, Proc. I. R. E., June 1953, pages 734–742.